W. A. JOHNSTON.
PIPE COUPLING.
APPLICATION FILED APR. 24, 1916.
1,216,459.
Patented Feb. 20, 1917.
2 SHEETS—SHEET 1.
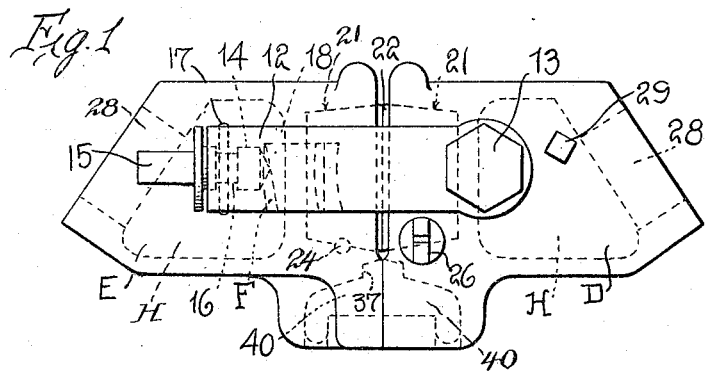
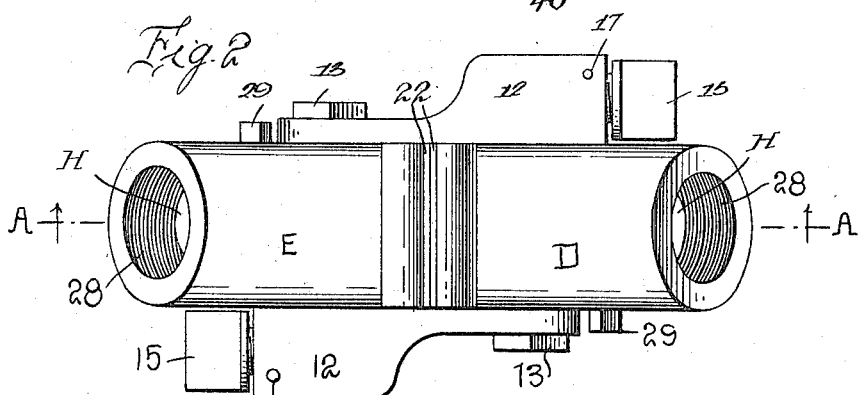
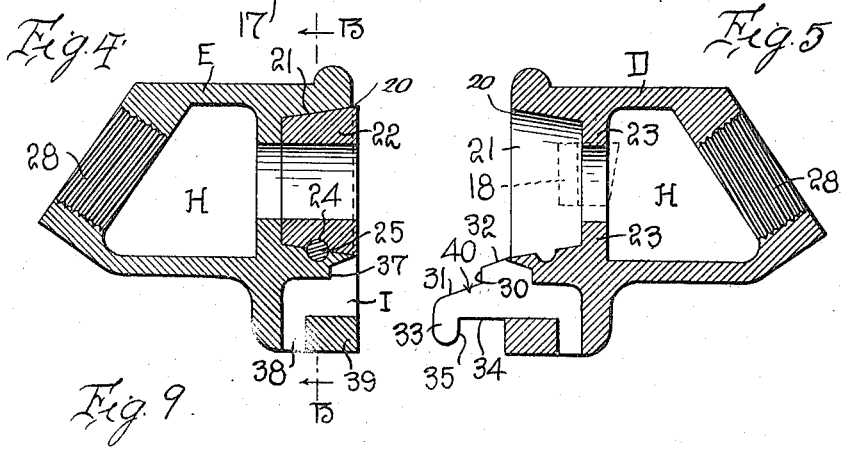
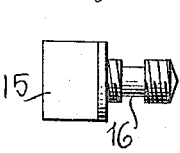
Inventor
Wᵐ A. Johnston,
By Watson E. Coleman
Attorney

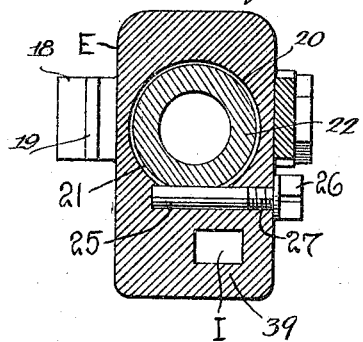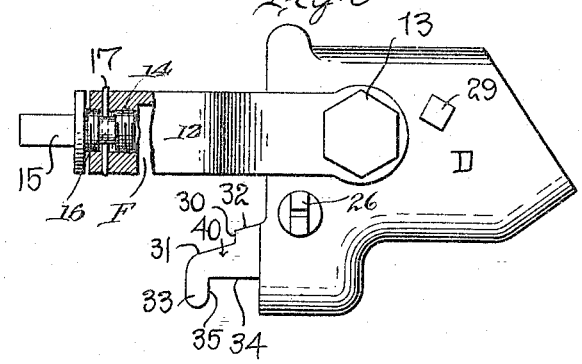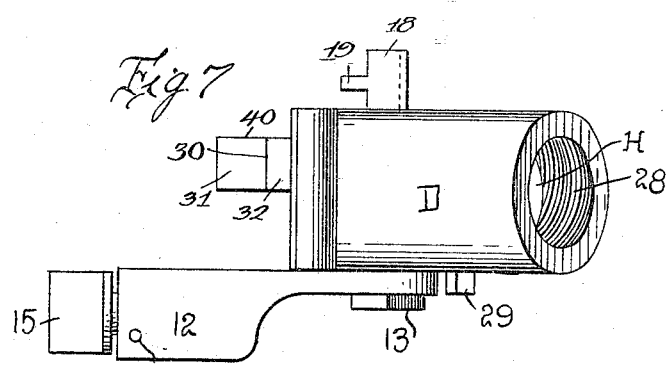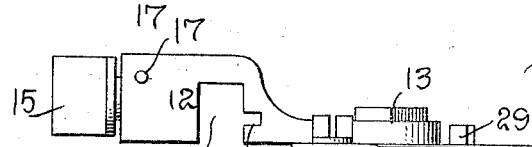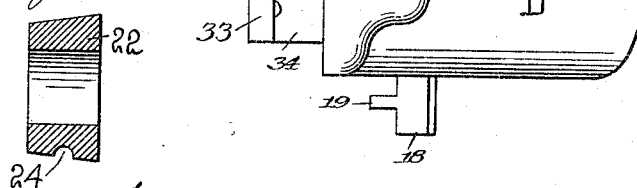

UNITED STATES PATENT OFFICE.

WILLIAM A. JOHNSTON, OF AURORA, ILLINOIS, ASSIGNOR OF ONE-HALF TO WILLIAM QUEENAN, OF AURORA, ILLINOIS.

PIPE-COUPLING.

1,216,459.  Specification of Letters Patent.  Patented Feb. 20, 1917.

Application filed April 24, 1916. Serial No. 93,206.

*To all whom it may concern:*

Be it known that I, WILLIAM A. JOHNSTON, a citizen of the United States, residing at Aurora, in the county of Kane and State of Illinois, have invented certain new and useful Improvements in Pipe-Couplings, of which the following is a specification, reference being had to the accompanying drawings.

This invention is a pipe coupling which is more particularly adapted for a steam line, though it may be used for air.

In the usual type of coupling as now employed, upon trains is one which may be readily disconnected through sources which may be accidental. Thus the common form of coupling is usually put together by swiveling action which means that the fluid in passing through, passes through passages which are substantially S-shape in form. This S-shape passage produces a choking action.

To overcome the objections to existing devices, this invention aims to provide a fluid-tight coupling. One object of the invention is to provide a coupling through which the fluid will pass in a substantially straight line, eliminating any choking action and eddy currents in the fluid by forming an expansion chamber intermediate the ends of a member of the coupling.

Another object is to provide a coupling that may be effectually attached to the hose pipe.

This invention further aims to provide a coupling that may be readily coupled and uncoupled in a minimum length of time.

The purpose of the invention is to provide a coupling which will eliminate personal injury when the members of the coupling are being mated or attached together and yet be efficient.

A further purpose is to provide a coupling having locking means to hold the members of the coupling in their correct operative position, the locking means being attached to each member in an effective and sure manner.

A still further purpose is to provide a coupling that will be mechanically strong and effective and of few parts, to reduce the cost of replacement of worn material.

A still further object of the invention is to provide a coupling having interlocking means positioned in a different plane from that of the locking means.

A still further aim of the invention is to provide a removable bushing for the port opening that may be readily and easily replaced when worn.

The invention broadly stated comprises a plurality of mating members provided with the usual hose pipe threaded connections through passages in the members disposed in a substantially straight line on the longitudinal axis of said members, port openings provided with removable bushings, interlocking members integral with and projecting from the body portions of a mating member, pivotally mounted locking members secured to the sides of the body portions of the mating members, guiding elements for the locking members, and means to retain the locking members in their operative position and thereby maintain the port openings in alinement and in operative engagement for eliminating the leakage of fluid between the port openings, said mating members being provided with a plurality of substantially flat exterior surfaces on which are disposed the locking members, the coöperation therebetween tending to prevent torsional or twisting movement of the members relative to each other, the coöperation between the locking and interlocking means with the mating members providing a method by which the mating members are held upon three sides against the movements operating to separate them.

One practical form of the invention is illustrated in the accompanying drawings, in which, Figure 1 is a side elevation of the mating members in their operative position;

Fig. 2 is a top plan view of the mating members in operative position;

Fig. 3 is a side elevation of one of the mating members showing the locking member and a stop lug therefor;

Fig. 4 is a sectional view through one of the mating members, showing the recessed portion to coöperate with the interlocking means on the line A—A of Fig. 2;

Fig. 5 is a sectional view showing one of the interlocking members on the line A—A of Fig. 2;

Fig. 6 is a sectional view on the line B—B of Fig. 4;

Fig. 7 is a top plan view of one of the mating members;

Fig. 8 is a bottom plan view of one of the mating members showing the locking member, the interlocking member and the stop lugs;

Fig. 9 is a side elevation of the screw means in the locking member to more fully illustrate the method of retaining the screw in the member;

Fig. 10 is a side elevation of one of the removable stop members which also serves to hold a soft metal bushing in the port opening;

Fig. 11 is a sectional view of the bushing showing the manner of its retention in the mating member.

The two mating members D and E are shown in their operative position in Fig. 1. In this view there is shown a locking member 12 pivotally mounted at 13. This locking member is provided at its forward end with an enlarged portion. At the outer or free end of this member 12 there is provided a threaded aperture 14 and to coöperate with this threaded portion there is provided a wing bolt 15.

The wing bolt 15 has intermediate of the threaded portion, a neck or recess 16 which is adapted to coöperate with a removable pin 17. This pin 17 is mounted in a suitable manner in the enlarged portion of the locking member 12 to hold the wing bolt 15 in an operative position with the threaded aperture 14. By having this neck portion, the bolt may be rotated within certain limits and prevent its accidental withdrawal at all times.

The enlarged portion of the locking member 12 is provided with a recess F. In one of the walls of this recessed portion there is formed a slot which communicates with the recess throughout its length. The inner face of this locking member 12 is substantially flat from end to end. The pivotal means or member 13 is shown as being a hexagonally headed bolt which is screwed into the wall of one of the mating members.

Oppositely positioned to and in the same relative axis of the pivot member 13 is a lug 18. This lug is preferably formed as an integral part of the mating member and projects outwardly sufficiently to engage with the recess F in the locking member and also with the offset recess G which communicates with the recess F. The forward wall has a projecting rib 19 to engage with the recess G. When the locking member 12 is swung over the lug 18, the threaded bolt 15 is screwed home and the point or free end engages with the lug 18. This prevents longitudinal movement with respect to the locking members and therefrom the mating members.

Each of the members D and E is provided at one end with a port 20 which communicates with an inwardly extending recess 21. This recess is preferably tapered from front to rear, as shown in Fig. 5. Within this recess there is positioned a preferably removable bushing 22. This bushing is retained at its inner or smaller end by means of the collar or shoulder 23 and which is preferably integral with the body portion of the mating member. This bushing 22 is provided with a grooved portion or recess 24.

The groove 24 coöperates with a stem 25 which is threaded preferably near one end, which end also carries a wing 26, by which the threaded portion may be adapted to engage with a threaded socket 27. The stem portion 25 passes through one wall of the recess 21 and projects or has a portion intermediate of its length disposed in the recess 21 to engage with the recess portion 24 of the bushing 22. Thus the bushing is held securely in all directions.

At the other end of the member D are formed the usual or customary threads 28 for making attachment with the hose pipe. The threads 28 are preferably cut upon the interior of the body of the member and are disposed at such an angle as will be most convenient for connection to the hose pipe.

The axial line of this threaded end is approximately at an angle of forty-five degrees to the longitudinal axis of the body portion of the member. Within the body portion of the member there is provided a chamber or cavity which is preferably somewhat larger in cross section than the free passage leading to the port. This chamber H may constitute a practical form of expansion chamber to compensate for different velocities of fluid through the ports when the two mating members are brought into operative relation.

The sides upon which are disposed the locking member 12 and the lug 18 are substantially flat and parallel to each other and when the two mating members are brought into abutting engagement, this allows the inner side or face of the locking member 12 to form good bearing surfaces and thus reduce the tendency, which torsional and twisting movements have to disengage them from their locking position.

It might be well to state here that the wing portion 26 of the stem 25 may serve as a stop to limit the downward movement of the locking member 12 and to limit movement in the opposite direction, there is provided another stop 29 which is shown as being rectangular in form, though its shape is immaterial. This stop 29 prevents the backward movement of the locking member 12 when the coupling is being disengaged and thereby prevents injury to the hands of the operator when disengaging.

Just below the port opening and to one side of the median line therethrough, projects an interlocking member 40. The upper faces of this interlocking arm or member lie preferably in two separate parallel planes and to connect these two surfaces into one surface, there is provided a shoulder portion 30, the larger surface of this interlocking member, arm or lug being angularly disposed with reference to the face of the port opening and of the mating member D. The smaller surface, which will be designated by 32 is disposed also at substantially the same angle as is formed by the larger surface 31. The lug 40 has a depending portion 33 which projects a short distance downward and whose outer surface is contiguous with the larger surface 31 of the lug.

The under surface 34 of the lug 40 is substantially flat and at right angles to the face of the port opening. The depending portion or hook 33 has its outer face substantially in a vertical plane, and the opposite wall 35 is preferably disposed angularly with reference to a plane parallel to the front wall.

Adjacent the lug or locking member 40 and the lower depending portion of the mating member, there is provided a recess I. Just within the recess and at the upper portion thereof, there is provided a shoulder 37. This shoulder 37 coöperates with the shoulder portion 30 of the lug 40. The top wall of this recessed portion is angularly disposed to correspond with the angle formed by the surface 32. The top wall of the recess which extends downwardly from the shoulder 37 is inclined in a suitable manner and terminates at the juncture of the vertical back wall in a curve of sufficient radius to enable the depending portion or hook 33 to pass freely therein.

The vertical back wall of this recess is continuous downwardly, terminating and forming one side of a substantially rectangular opening 38 into which the hook or depending portion 33 passes. Across the lower portion of the recess I, there is disposed a web 39 whose inner edge is separated from the back wall. The hook or depending portion 33 when the two mating members are assembled passes therein and hooks around this surface.

The method of engaging and the points of contact of the interlocking arm or lug 40 with the various points within the recess I are very clearly shown in Fig. 1.

In using this coupling in a practical way, assuming that the hose pipe is connected to the threaded end, the mating members are positioned at an angle with reference to each other and the interlocking lugs placed in their corresponding recesses when the two members are brought into alinement. This interlocking provides for a slight play between the abutting faces of the bushing.

To complete the operation and effect an air tight joint, the locking members 12 are swung over into engagement with their corresponding lugs, the wing bolts carried by the locking members screwed home, thus forcing the two exterior faces of the bushing in the port openings into a mechanical engagement and effectually preventing any leakage of fluid at their juncture of abutment.

The bushings 22 which may be made of any material but are thought at the present time that they had better be made of some substance which is more yieldable than the material from which the mating members are made.

Thus when the two surfaces are brought into abutting engagement and the wing bolts are tightened, these two surfaces are made to conform to each other and the pressure exerted upon the faces is transmitted in a downward direction to the collar or shoulder 23, which communicates with the chamber H in the body of the mating member.

Thus it will be seen that in order to interlock these members D and E with each other, the projection upon the interlocking lugs must pass inwardly to engage with the web formed in the lower portion of each of the body members.

To disengage the two mating members from each other, as when uncoupling the train pipe, the wing bolts are unloosened, swung over until they rest against the stop lug 29, which prevents the locking member 12 from striking the hand or hands of the person uncoupling. After these locking levers have been turned downward, against the stop lug, the coupling is slightly lifted to take off the strain caused by its weight, the two parts are grasped in such a fashion that the two mating members will be separated at their upper portions. This motion of separating is of a similar type to that of separating hinged objects. As for practical purposes, the interlocking means serve as a hinge until the parts are sufficiently separated to withdraw the lugs from their respective recesses.

While this coupling is more particularly adapted for use on steam lines, it is also adapted for use with the air brake system without practically any change which makes for interchangeability of the couplings. As the one coupling will answer for the two services, it will not be necessary for a railroad to carry but one style.

Minor changes in form and details of construction may be resorted to without departing from the spirit of the invention or from the scope of the appended claims.

What is claimed is:—

1. A pipe coupling comprising mating members having port openings, each of said members being provided with a laterally projecting lug provided with an engaging surface including a rib extending at right angles thereto, a horizontally pivotally mounted locking arm having recesses formed therein near the outer end, a removably secured bolt positioned in the end of the arm, the end of the bolt being formed to frictionally engage with the surface of the lug, said arm when so positioned, contacting with contiguous sides of each of the members which lie in the same plane, and interlocking members consisting of a projecting hooked lug adjacent a recess formed below the port opening so that when said lugs are positioned in their respective coöperating recesses, longitudinal movement of the mating members is restricted, and also to form a hinged connection between the members when coupling and uncoupling.

2. A pipe coupling comprising mating members having port openings, each of said members being provided with a laterally extending lug provided with an engaging surface including a rib extending at right angles thereto, a horizontally pivotally mounted locking arm having recesses formed therein near the outer end thereof to receive the lug and rib of the second member, a removably secured bolt secured in the end of the arm, the end of the bolt being formed to frictionally engage with the surface of the lug, said arm when so positioned contacting with contiguous sides of each of the members which lie in the same plane.

3. A pipe coupling comprising mating members having port openings, each of said members being provided with a laterally projecting lug provided with an engaging surface and including a rib extending at right angles thereto, a horizontally pivotally mounted locking arm having recesses formed therein near the outer end to receive the lug and rib of the second member, a bolt threaded through the outer end portion of the arm and adapted to frictionally engage with the surface of the lug, a portion of said bolt intermediate its length being reduced, and a retaining member disposed through the arm and positioned within the reduced portion of the bolt whereby the bolt is held against removal and is afforded a limited movement in either direction.

4. A pipe coupling comprising mating members having port openings, each of said members being provided with a laterally extending lug provided with an engaging surface including a rib extending at right angles thereto, a horizontally pivotally mounted locking arm having recesses mounted therein near the outer end thereof to receive the lug and rib of the second member, a removably secured bolt secured in the end of the arm, the end of the bolt being formed to frictionally engage with the surface of the lug, said arm when so positioned contacting with contiguous sides of each of the members which lie in the same plane, and means for limiting the pivotal movement of the locking arm in either direction.

In testimony whereof I hereunto affix my signature in the presence of two witnesses.

WILLIAM A. JOHNSTON.

Witnesses:
　JOHN S. MERCER,
　FRED L. THATCHER.

Copies of this patent may be obtained for five cents each, by addressing the "Commissioner of Patents, Washington, D. C."